United States Patent
Higashino et al.

(10) Patent No.: US 12,195,283 B2
(45) Date of Patent: Jan. 14, 2025

(54) LINEAR CONVEYANCE SYSTEM AND CONTROL APPARATUS

(71) Applicant: Mitsubishi Electric Corporation, Tokyo (JP)

(72) Inventors: Makoto Higashino, Tokyo (JP); Yasuhiro Endo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/722,048

(22) PCT Filed: Jun. 1, 2022

(86) PCT No.: PCT/JP2022/022296
§ 371 (c)(1),
(2) Date: Jun. 20, 2024

(87) PCT Pub. No.: WO2023/233576
PCT Pub. Date: Dec. 7, 2023

(65) Prior Publication Data
US 2024/0417182 A1 Dec. 19, 2024

(51) Int. Cl.
*B65G 43/00* (2006.01)
(52) U.S. Cl.
CPC .................... *B65G 43/00* (2013.01)
(58) Field of Classification Search
CPC ..................................... B65G 43/00
(Continued)

(56) References Cited

U.S. PATENT DOCUMENTS 4,772,837 A * 9/1988 MacMunn ........... G05B 19/416
318/135
9,496,815 B2 * 11/2016 Kadynski ............. H02P 25/06
(Continued)

FOREIGN PATENT DOCUMENTS

DE 102018111715 A1 11/2019
DE 102021124123 A1 3/2023
(Continued)

OTHER PUBLICATIONS

International Search Report and Written Opinion mailed on Aug. 16, 2022, received for PCT Application PCT/JP2022/022296, filed on Jun. 1, 2022, 8 pages including English Translation.
(Continued)

*Primary Examiner* — Gene O Crawford
*Assistant Examiner* — Lester Rushin, III
(74) *Attorney, Agent, or Firm* — XSENSUS LLP

(57) ABSTRACT

A linear conveyance system includes: movable portions including permanent magnets; a fixed portion generating magnetic fields for driving the movable portions, and arranged to form a conveyance path for the movable portions; a stator control unit energizing the coil and detecting positions of the movable portions; and a controller unit generating and outputting current commands for driving the movable portions to the stator control unit based on position information on the positions of the movable portions, wherein the movable portions include an output movable portion on which an output device that outputs energy or data is to be installed and a machining movable portion on which a machining device is to be installed, the machining device being to be used for machining of a workpiece, and being connected to the output device by a cable, and the controller unit controls the output movable portion and the machining movable portion.

9 Claims, 3 Drawing Sheets

(58) Field of Classification Search
USPC .......................................................... 700/230
See application file for complete search history.

(56) References Cited

U.S. PATENT DOCUMENTS

| | | |
|---|---|---|
| 2014/0027228 A1 | 1/2014 | Tojima et al. |
| 2019/0152724 A1* | 5/2019 | Philipp .................. B65G 43/00 |
| 2021/0155422 A1 | 5/2021 | Kastinger et al. |

FOREIGN PATENT DOCUMENTS

| | | |
|---|---|---|
| JP | S57-005659 B2 | 2/1982 |
| JP | 04-141706 A | 5/1992 |
| JP | H07-017619 A | 1/1995 |
| JP | 2525163 Y2 | 2/1997 |
| JP | 3112577 U | 8/2005 |
| JP | 2007-004527 A | 1/2007 |
| JP | 2012-237116 A | 12/2012 |
| JP | 2021-528336 A | 10/2021 |

OTHER PUBLICATIONS

Decision to Grant mailed on Feb. 21, 2023, received for JP Application 2022-567026, 5 pages including English Translation.
Office Action mailed on Sep. 10, 2024 for the corresponding German patent application No. 11 2022 005 188.4 with an English machine translation thereof. total 14 pages.

* cited by examiner

LINEAR CONVEYANCE SYSTEM AND CONTROL APPARATUS

CROSS-REFERENCE TO RELATED APPLICATION

This application is a national stage application, pursuant to 35 U.S.C. § 371, of International Patent Application No. PCT/JP2022/022296, filed Jun. 1, 2022, the entire contents of which are incorporated herein by reference.

FIELD

The present disclosure relates to a linear conveyance system and a control apparatus that control linear conveyance using a fixed portion and a movable portion.

BACKGROUND

In a production line of an automated factory, movable portions installed on the same conveyance path are separately controlled, so that a plurality of processes is constructed on the same conveyance path. This achieves reduction of takt time, and the like. For example, a linear conveyance system to be applied to a production line includes a movable portion, a fixed portion, and a controller unit. The movable portion includes a permanent magnet. The fixed portion includes a coil. The controller unit controls a position of the movable portion. In this linear conveyance system, a machining device is installed on the movable portion. Therefore, the machining device can simultaneously move and perform machining work in parallel. This enables further reduction of takt time, and the like.

A power supply unit, such as a battery or a noncontact power supply device, for supplying power to the machining device is installed, together with the machining device, on the movable portion of such a linear conveyance system. In this case, the weight of the power supply unit increases as the power supply capacity of the battery, the noncontact power supply device, or the like increases. Therefore, in a case where acceleration is reduced during operation so as to allow the acceleration to fall within a range of the driving capability of the movable portion, takt time increases. In addition, when the weight of the movable portion increases, vibration increases, so that control accuracy deteriorates when the movable portion stops moving.

A mobile power supply apparatus of Patent Literature 1 is configured as follows. In the process of inspecting a device, the device to be inspected is placed on an automated guided vehicle and moved along a specific path. At the same time, a power supply truck on which a power source is installed is caused to travel side by side with the automated guided vehicle so as to supply power to the device to be inspected.

CITATION LIST

Patent Literature

Patent Literature 1: Japanese Patent Application Laid-open No. 7-17619

SUMMARY OF INVENTION

Problem to be Solved by the Invention

However, in the technique of Patent Literature 1 described above, the automated guided vehicle and the power supply truck are controlled by separate control apparatuses. Thus, the power supply truck controls the driving of a motor for traveling of the power supply truck while constantly detecting a distance from the automated guided vehicle by a sensor, and moves at a constant distance from the automated guided vehicle. In the technique of Patent Literature 1, the automated guided vehicle and the power supply truck are controlled by separate control apparatuses, and it takes time for the power supply truck to perform a process of detection by means of the sensor and a process of controlling the driving of the motor for traveling after the detection by the sensor. Therefore, the technique of Patent Literature 1 has a problem in that the automated guided vehicle and the power supply truck cannot be moved with a high acceleration/deceleration and thus, strong constraints need to be imposed on the drive pattern of the automated guided vehicle which is a movable portion.

The present disclosure has been made in view of the above, and an object of the present disclosure is to provide a linear conveyance system capable of causing movable portions to move with a high acceleration/deceleration, by reducing constraints to be imposed on a drive pattern of the movable portions.

Means to Solve the Problem

In order to solve the above-described problem and achieve the object, a linear conveyance system of the present disclosure includes: a plurality of movable portions including permanent magnets; and a fixed portion including a coil that generates magnetic field for driving the movable portions, the fixed portion being coupled and arranged to form a conveyance path along which the movable portions move. Furthermore, the linear conveyance system of the present disclosure includes: a stator control unit that energizes the coil and detects positions of the movable portions; and a controller unit that generates current commands and outputs the current commands to the stator control unit, the controller unit generating the current commands based on position information, the current commands being for driving the movable portions, the position information being information on the positions of the movable portions. The movable portions include an output movable portion and a machining movable portion, the output movable portion being a movable portion on which an output device that outputs energy or data is to be installed, the machining movable portion being a movable portion on which a machining device is to be installed, the machining device being to be used for machining of a workpiece, the machining device being to be connected to the output device by a cable so as to receive the energy or the data from the output device. The controller unit controls the output movable portion and the machining movable portion.

Effects of the Invention

The linear conveyance system according to the present disclosure has an effect of enabling movable portions to move with a high acceleration/deceleration, by reducing constraints to be imposed on a drive pattern of the movable portions.

DESCRIPTION OF EMBODIMENTS

Hereinafter, linear conveyance systems and a control apparatus according to embodiments of the present disclosure will be described in detail with reference to the drawings.

First Embodiment

Figure 1:
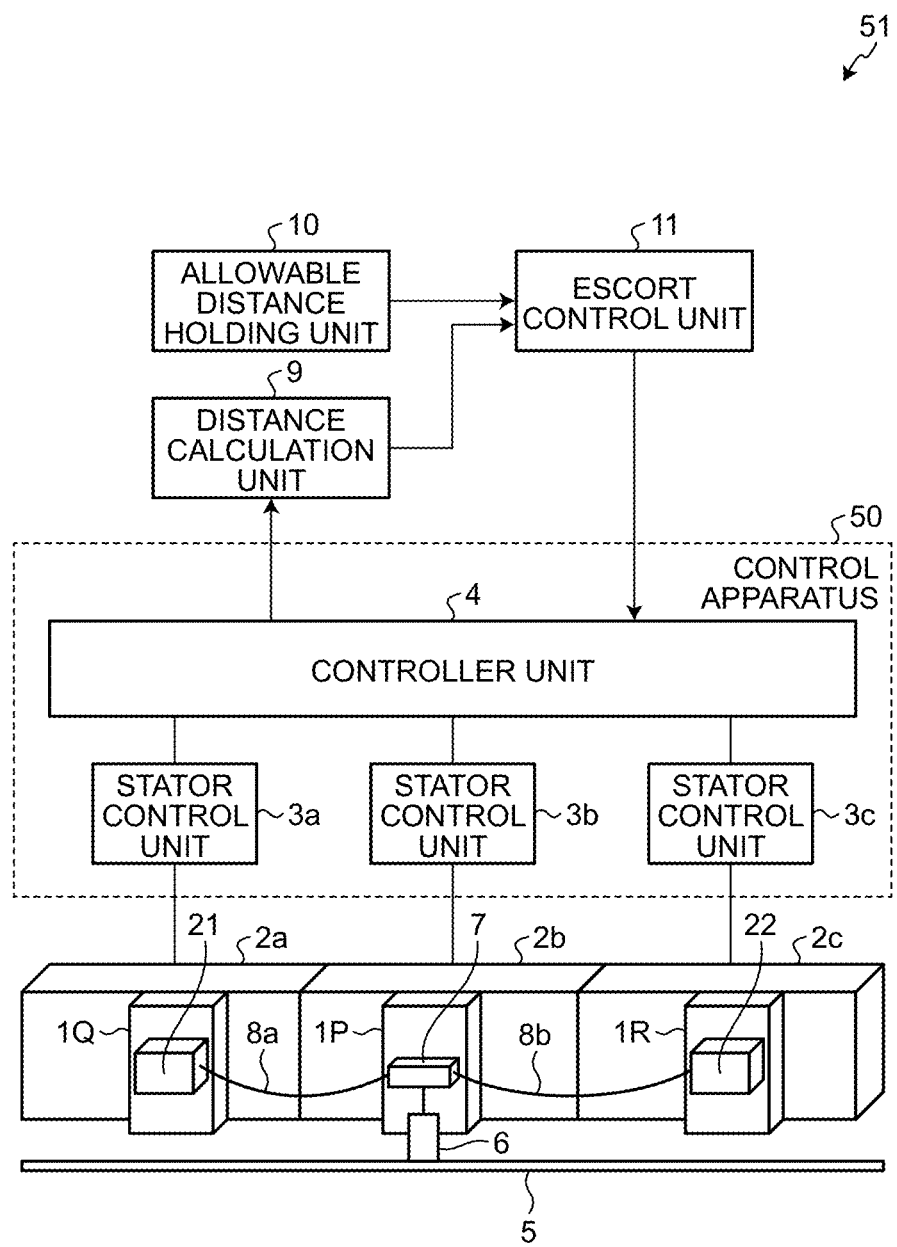
FIG. 1 is a diagram illustrating a configuration of a linear conveyance system according to a first embodiment.

FIG. 1 is a diagram illustrating a configuration of a linear conveyance system according to a first embodiment. A linear conveyance system 51 is a system that causes movable portions 1P to 1R to move by means of linear motors. The linear conveyance system 51 includes the movable portions 1P to 1R, fixed portions (stators) 2a to 2c, a control apparatus 50, a distance calculation unit 9, an allowable distance holding unit 10, and a running-alongside control unit 11.

Each of the movable portions 1P to 1R has a permanent magnet. The movable portions 1P to 1R move according to externally applied shifting magnetic fields. The linear conveyance system 51 can change the moving direction of the movable portions 1P to 1R and thrust power to be generated for the movable portions 1P to 1R, according to directions and intensities of the shifting magnetic fields. Note that the number of movable portions may be two, or may be four or more. The movable portions 1P to 1R are arranged along the moving direction of the movable portions 1P to 1R. FIG. 1 illustrates a case where the movable portion 1P is disposed beside the movable portion 1Q, and the movable portion 1R is disposed beside the movable portion 1P.

The fixed portions 2a to 2c are arranged along a path (conveyance path) along which the movable portions 1P to 1R move, that is, along the moving direction. FIG. 1 illustrates a case where the fixed portion 2b is disposed beside the fixed portion 2a, and the fixed portion 2c is disposed beside the fixed portion 2b. The fixed portions 2a to 2c include coils for generating shifting magnetic fields so as to drive the movable portions 1P to 1R.

The fixed portions 2a to 2c separately drive the movable portions 1P to 1R by performing coil energization according to respective positions of the movable portions 1P to 1R. The fixed portions 2a to 2c can drive the movable portions 1P to 1R at any desired positions and any desired speeds within a range in which the movable portions 1P to 1R do not collide with each other.

Furthermore, the fixed portions 2a to 2c have a holding mechanism for holding the movable portions 1P to 1R. As a result, the fixed portions 2a to 2c can prevent the movable portions 1P to 1R from falling off and drive the movable portions 1P to 1R along the fixed portions 2a to 2c. The fixed portions 2a to 2c are continuously coupled in a mechanical manner, and can form any desired path. That is, the fixed portions 2a to 2c is coupled and arranged, so that a fixed conveyance path can be formed.

Note that the number of fixed portions may be two, or may be four or more. In addition, each fixed portion may have a shape corresponding to the shape of the conveyance path, and may have a linear shape, a curved shape, or the like. In addition, the number of fixed portions is not necessarily equal to the number of movable portions. Furthermore, the positional relationship between the movable portions 1P to 1R and the fixed portions 2a to 2c is not fixed on a one-to-one basis. For example, the movable portion 1P can move across the fixed portions 2a to 2c. Similarly, the movable portions 1Q and 1R can move across the fixed portions 2a to 2c.

A stator control unit 3a controls the fixed portion 2a. A stator control unit 3b controls the fixed portion 2b. A stator control unit 3c controls the fixed portion 2c. The stator control units 3a to 3c include inverter units (not illustrated) for energizing the coils of the fixed portions 2a to 2c, respectively, and also include position detection units (not illustrated) that detect respective positions of the movable portions 1P to 1R. Each inverter unit performs energization of a coil and detection of a flowing current.

The position detection units detect magnetic fields generated by the permanent magnets of the movable portions 1P to 1R by means of, for example, Hall sensors attached to the fixed portions 2a to 2c, and perform position detection based on the detected magnetic fields. Note that the stator control units 3a to 3c may detect the respective positions of the movable portions 1P to 1R by any method. That is, the method of position detection is not limited to the method described in the first embodiment. The stator control units 3a to 3c respectively correspond to the fixed portions 2a to 2c on a one-to-one basis, and the correspondence relationship is not changed during control.

A controller unit 4 separately controls the driving of the movable portions 1P to 1R. The controller unit 4 generates current commands directed to the stator control units 3a to 3c based on respective operation profiles of the movable portions 1P to 1R written by a user by means of an engineering tool or the like. That is, the controller unit 4 generates current commands directed to the inverter units, for driving the movable portions 1P to 1R according to the operation profiles. Each operation profile is defined by, for example, an operation program created by the user.

In addition, the controller unit 4 detects the positions of all the movable portions 1P to 1R in the linear conveyance system 51 by collecting position information on the movable portions 1P to 1R acquired by the stator control units 3a to 3c.

Since the controller unit 4 has the above-described functions, total of the movable portions 1P to 1R can be integrally controlled. As a result, the controller unit 4 can freely and separately control the movable portions 1P to 1R while constantly grasping the respective positions and states of the movable portions 1P to 1R.

Note that the controller unit 4 may control some of the movable portions 1P to 1R on the basis of operation profiles for the some of the movable portions 1P to 1R, and may control another or other movable portions on the basis of position information on the movable portions 1P to 1R. For example, the controller unit 4 controls the movable portion 1P based on the position information on the movable portion 1P and the operation profile of the movable portion 1P created in advance.

In addition, the controller unit 4 controls the movable portion 1Q based on an operation profile of the movable portion 1Q and the position information on the movable portion 1Q. The operation profile of the movable portion 1Q is created by the running-alongside control unit 11 based on the position information on the movable portions 1P and 1Q.

Furthermore, the controller unit 4 controls the movable portion 1R based on an operation profile of the movable portion 1R and the position information on the movable portion 1R. The operation profile of the movable portion 1R is created by the running-alongside control unit 11 based on the position information on the movable portions 1P and 1R.

Each operation profile includes a position command. That is, the controller unit 4 controls the movable portions 1P to 1R based on the position commands of the operation profiles and the position information on the movable portions 1P to 1R.

For example, in the case of the positional relationship between the movable portions 1P to 1R and the fixed portions 2a to 2c illustrated in FIG. 1, the controller unit 4 generates a current command directed to the stator control unit 3b for controlling the movable portion 1P, based on a position command (first position command) of an operation profile transmitted from the running-alongside control unit 11. In addition, the controller unit 4 generates current commands directed to the stator control units 3a and 3c for controlling the movable portions 1Q and 1R, respectively, based on, for example, position commands (second position commands) of operation profiles created by the user. Note that, for example, in the case of a positional relationship in which the movable portion 1P is located at a boundary between the fixed portions 2b and 2c, the controller unit 4 generates current commands directed to the stator control units 3b and 3c based on the position command (first position command) of the operation profile transmitted from the running-alongside control unit 11. Furthermore, for example, in the case of a positional relationship in which the movable portion 1Q is located at a boundary between the fixed portions 2a and 2b, the controller unit 4 generates current commands directed to the stator control units 3a and 3b based on a position command (second position command) of an operation profile created by the user. In addition, the controller unit 4 transmits, to the distance calculation unit 9, position information indicating the positions of the movable portions 1P to 1R acquired by the stator control units 3a to 3c.

In the linear conveyance system 51, since the movable portions 1P to 1R are controlled by the common controller unit 4, it is possible to cause the movable portions 1P to 1R to move with a high acceleration/deceleration. That is, in the linear conveyance system 51, the movable portions 1P to 1R are controlled by the common controller unit 4. Therefore, for example, it is not necessary for the movable portion 1P to install a sensor on itself, it is not necessary for the movable portion 1R to detect its own movement by its own sensor, and it is not necessary to control movement of the movable portion 1P after the movable portion 1R is detected by the sensor. As a result, it is possible to reduce constraints to be imposed on the drive patterns of the movable portions 1Q and 1R.

The distance calculation unit 9 calculates distances between adjacent movable portions based on the position information on the movable portions 1P to 1R. The distance calculation unit 9 transmits the calculated distances and the position information on the movable portions 1P to 1R to the running-alongside control unit 11.

The allowable distance holding unit 10 stores allowable ranges (allowable proximity ranges to be described below) of distances between adjacent movable portions. The running-alongside control unit 11 generates a position command specifying a position of at least one of the movable portions 1P to 1R based on the distances between the adjacent movable portions calculated by the distance calculation unit 9, the allowable proximity ranges stored in the allowable distance holding unit 10, and the position information on the movable portions 1P to 1R. The running-alongside control unit 11 generates the position command such that the adjacent movable portions do not collide with each other and cables 8a and 8b connecting the adjacent movable portions do not come off. An example of the running-alongside control unit 11 is a motion controller. Details of the distance calculation unit 9, the allowable distance holding unit 10, and the running-alongside control unit 11 will be described below. Note that the linear conveyance system 51 may include three or more movable portions.

Uses of the linear conveyance system 51 are roughly divided into conveyance uses and machining uses. Here, a linear conveyance system of a comparative example will be described. When the linear conveyance system of the comparative example is used for a conveyance purpose, an object of the use of the linear conveyance system is to move a workpiece, which is an object to be conveyed, to a target position in a state where the workpiece is loaded on a movable portion. After reaching the target position, the workpiece is ejected or machined by a device installed outside. In this case, it is necessary to simply load the workpiece on the movable portion, and it is not necessary to load, on the movable portion, a machining device for ejecting or machining the workpiece loaded on the movable portion. Thus, power supply to and communication with the machining device is unnecessary. Therefore, the weight of the workpiece is the only load weight to be applied to the movable portion, and almost all the output of the movable portion can be used for movement of the workpiece.

Meanwhile, when the linear conveyance system of the comparative example is used for a machining purpose, an object of the use of the linear conveyance system is to perform machining while causing a movable portion to move with a machining device loaded thereon. In this case, power supply and communication are necessary for operation of an electric device such as a motor incorporated in the machining device. Therefore, when the power supply or the like is installed on the same movable portion, the output of the movable portion is used for movement of a power supply device and a communication device in addition to movement of the machining device. Therefore, when the linear conveyance system of the comparative example is used for a machining purpose, a more severe condition for output is imposed than in the case of using the linear conveyance system of the comparative example for a conveyance purpose.

In general, it is necessary to perform positioning control with high accuracy when performing machining in a linear conveyance system. Meanwhile, control performance of a movable portion deteriorates as the weight of a power source or the like increases. Therefore, in order to maximize the positioning control performance of the movable portion, it is desirable to minimize the load weight to be applied to the movable portion on which the machining device is installed. Note that the load weight to be applied to the movable portion refers to the weight of the movable portion including the weight of a load such as the machining device loaded on the movable portion.

In order to solve these problems, in the linear conveyance system 51 of the first embodiment, movable portions on which machining devices 21 and 22 are installed are separated from a movable portion on which an output device, such as a power supply device, is installed. That is, in the linear conveyance system 51, the machining devices 21 and 22 and the output device are installed on separate movable portions. Examples of the output device include a power supply device that outputs power, and a communication device that outputs data. Note that the communication device may receive data from the machining devices 21 and 22.

The machining devices 21 and 22 are devices to be used for machining of a workpiece. Examples of the machining devices 21 and 22 include a drive device (servomotor, servo amplifier, and arm), a proximity sensor, a camera, a robot, a measurement device, and an inspection device. Note that the machining of a workpiece includes a process to be performed on the workpiece before a completed piece is obtained, and includes, for example, fixation, movement, deformation, and inspection of the workpiece. An example of the drive device is a conveyance device that performs sliding conveyance of a semiconductor wafer. An example of the communication device is a device (controller) that controls the machining device.

For example, the linear conveyance system 51 is configured as follows. An output device such as a power supply device or a communication device is installed on the movable portion 1P. The machining device 21 is installed on the movable portion 1Q. The machining device 22 is installed on the movable portion 1R. Then, the movable portion 1P and the movable portion 1Q are connected by the cable 8a. In addition, the movable portion 1P and the movable portion 1R are connected by the cable 8b. As a result, power or data are transmitted from the output device installed on the movable portion 1P to the machining devices 21 and 22 installed on the movable portions 1Q and 1R, respectively. In the first embodiment, the movable portion 1P on which the output device is installed serves as an output movable portion, and the movable portions 1Q and 1R on which the machining devices 21 and 22 are installed, respectively, serve as machining movable portions.

Note that the output device of the movable portion 1P can also, for example, supply power to, or transmit and receive data to and from other movable portions (not illustrated) connected to the movable portions 1Q and 1R by cables (not illustrated). For example, in this case, the output device of the movable portion 1P supplies power, or transmits and receives data via the movable portions 1Q and 1R. The output device of the movable portion 1P can, for example, supply power to, or transmit and receive data to and from any device directly or indirectly connected to the output device by a cable. Note that the movable portions 1P to 1R may perform data communication with each other by wireless communication.

As described above, in the linear conveyance system 51, a power supply device or a communication device is installed on the movable portion 1P. Since the movable portion 1P is connected to the machining devices 21 and 22 by the cables 8a and 8b, respectively, no problem is caused even if the power supply device or the communication device is mechanically separated from the machining devices 21 and 22. That is, an output device that outputs electric energy, data, or the like is installed on the movable portion 1P serving as an output movable portion.

In addition, for example, the machining devices 21 and 22 that receive electric energy or data output from the movable portion 1P are respectively installed on the movable portions 1Q and 1R serving as machining movable portions. Note that the machining devices 21 and 22 installed on the movable portions 1Q and 1R, respectively, may transmit data to the communication device or the like installed on the movable portion 1P. That is, transmission and reception of data may be performed between devices installed on the movable portions 1P to 1R.

In the linear conveyance system 51, the controller unit 4 causes the movable portion 1P, which is the output movable portion, to follow the movable portions 1Q and 1R, which are the machining movable portions, in such a way as to maintain an appropriate positional relationship between the movable portions 1P to 1R. Therefore, the output device can supply power or data to the machining devices 21 and 22. As described above, in the linear conveyance system 51, the output device can be installed on the movable portion 1P that is a movable portion other than the movable portions 1Q and 1R on which the machining devices 21 and 22 are installed, respectively. As a result, the machining devices 21 and 22 can be reduced in weight. Therefore, the linear conveyance system 51 can enhance the positioning control performance of the movable portions 1Q and 1R on which the machining devices 21 and 22 are installed, respectively.

Here, details of the power supply device to be installed on the movable portion 1P will be described. Here, a case where the power supply device to be installed on the movable portion 1P is a noncontact power supply device will be described as an example. A noncontact power supply device that supplies power to the machining devices 21 and 22 can be connected in a noncontact manner to a primary-side power supply 5 that supplies power. The noncontact power supply device includes a pickup core 6 and a regulator 7. The pickup core 6 receives power from the primary-side power supply 5. The regulator 7 regulates an output voltage from the pickup core 6. In this case, the output of the regulator 7 is input to the machining devices 21 and 22 in the linear conveyance system 51. Note that the power supply device may be a contact power supply device. In this case, the power supply device is connected to the primary-side power supply 5 via a cable. Furthermore, the power supply device may be a battery.

The primary-side power supply 5 is fixedly disposed along a track of the pickup core 6, and the pickup core 6 and the regulator 7 move in a state of being fixed to the movable portion 1P serving as an output movable portion.

For example, only the pickup core 6 and the regulator 7 are installed on the movable portion 1P. Since only the pickup core 6 and the regulator 7 are installed on the movable portion 1P, the movable portion 1P can move within a range of the loading capacity of the movable portion 1P.

In the linear conveyance system 51, only the machining devices 21 and 22 are installed on the movable portions 1Q and 1R, respectively, and power is supplied to the machining devices 21 and 22 by means of the power supply device installed on the movable portion 1P and the cables 8a and 8b. That is, the pickup core 6 and the regulator 7 need not be installed on the movable portions 1Q and 1R. Thus, in the linear conveyance system 51, only the machining devices 21 and 22 are installed on the movable portions 1Q and 1R, respectively. As a result, even in a case where the movable portions 1Q and 1R cause the machining devices 21 and 22 to operate, respectively, while the movable portions 1Q and 1R are moving, an increase in load weight to be applied to the movable portions 1Q and 1R can be prevented. For example, in the linear conveyance system 51, the output movable portion on which the output device is installed is lighter in weight and smaller in size than the machining movable portions on which the machining devices 21 and 22 are installed. For example, in the linear conveyance system 51, the load weight to be applied to the movable portion is smaller in the output movable portion on which the output device is installed than in the machining movable portions on which the machining devices 21 and 22 are installed. As a result, when the machining movable portions and the output movable portion are controlled by the common controller unit 4, the output movable portion can sufficiently follow the high acceleration/deceleration of the machining movable portions. In addition, for example, in a case where the load weight to be applied to the output movable portion on which the output device is installed is larger than the load weight to be applied to the machining movable portions on which the machining devices 21 and 22 are installed, the operation speeds of the machining movable portions need to be equal to or lower than the operation speed of the output movable portion, but operation speed is improved as compared with a case where the machining devices and the output device are installed on the same movable portion. In addition, the output movable portion may be configured as follows. For example, the number of permanent magnets of an output movable portion is made smaller than the number of permanent magnets of a machining movable portion, or the size of a permanent magnet of the output movable portion is made smaller than the size of a permanent magnet of the machining movable portion, so as to make the output movable portion lighter in weight and smaller in size than the machining movable portion. As a result, the linear conveyance system 51 can reduce the cost of the output movable portion and reduce the area to be occupied by the output movable portion in the conveyance path.

Therefore, the linear conveyance system 51 can cause the movable portions 1Q and 1R to move with a high acceleration/deceleration. Furthermore, in the linear conveyance system 51, since the load weight to be applied to the movable portions 1Q and 1R is reduced, the positioning control performance of the movable portions 1Q and 1R can be improved. Since the linear conveyance system 51 can control the movable portions 1Q and 1R with a high acceleration/deceleration and high accuracy, it is possible to reduce constraints to be imposed on the drive patterns of the movable portions 1Q and 1R.

Control of machining to be performed in the machining devices 21 and 22 is executed by, for example, a host controller higher than the controller unit 4. In this case, the host controller may control the machining devices 21 and 22 by wire communication, or may control the machining devices 21 and 22 by wireless communication. The host controller collects various data from the machining devices 21 and 22, and stores the data in a storage device or the like. The host controller may control the machining devices 21 and 22 based on the data collected from the machining devices 21 and 22.

Note that control of machining to be performed in the machining devices 21 and 22 may be executed by the controller unit 4. Also in this case, the controller unit 4 may control the machining devices 21 and 22 by wire communication, or may control the machining devices 21 and 22 by wireless communication.

Furthermore, in the linear conveyance system 51, a single or a plurality of machining devices can be connected to a single output device. The controller unit 4 of the linear conveyance system 51 controls each of the movable portions 1P to 1R so that the cables 8a and 8b do not come off. Here, a description will be given of an example in which the controller unit 4 performs position control for a combination of the two movable portions 1P and 1Q.

Here, a description will be given of a case where the movable portion 1P serves as an output movable portion on which a power supply device is installed, and the movable portion 1Q serves as a machining movable portion on which the machining device 21 is installed. The controller unit 4 collects position information on the movable portions 1P and 1Q acquired by the stator control units 3a and 3b. The controller unit 4 transmits the collected position information on the movable portions 1P and 1Q to the distance calculation unit 9.

The distance calculation unit 9 calculates a difference between the positions of the movable portions 1P and 1Q. That is, the distance calculation unit 9 calculates a distance (hereinafter, may be referred to as an inter-movable portion distance) between the movable portions 1P and 1Q. For example, assuming that Ap denotes the position of the movable portion 1P, and that Aq denotes the position of the movable portion 1Q, the distance calculation unit 9 calculates $|\Delta(Ap-Aq)|$ that is an absolute value difference between the positions of the movable portions 1P and 1Q. The distance calculation unit 9 transmits the calculated inter-movable portion distance to the running-alongside control unit 11.

In addition, the allowable distance holding unit 10 holds an allowable proximity range that is a proximity range (distance) allowed between the movable portions 1P and 1Q. Specifically, the allowable distance holding unit 10 holds an allowable proximity range $Rng(Ap-Aq)$ represented by a range from $Min(Ap-Aq)$, which is a minimum allowable value of $|\Delta(Ap-Aq)|$, to $Max(Ap-Aq)$, which is a maximum allowable value of $|\Delta(Ap-Aq)|$. A relationship among $Min(Ap-Aq)$, $Max(Ap-Aq)$, and the allowable proximity range $Rng(Ap-Aq)$ is as follows: $Min(Ap-Aq) \leq Rng(Ap-Aq) \leq Max(Ap-Aq)$.

For example, $Min(Ap-Aq)$ is set on the assumption of a situation where the movable portions 1P and 1Q are too close to each other and the cable 8a interferes, or a situation where the cable 8a bends to come into contact with the power supply device, the machining device 21, the movable portions 1P and 1Q, or the primary-side power supply 5.

In addition, $Max(Ap-Aq)$ is set on the assumption of, for example, a situation where the movable portions 1P and 1Q are too far away from each other and the cable 8a may come off, a cable connector portion may be damaged, or the main body of the cable 8a may be damaged.

The controller unit 4 controls the movable portion 1P such that $|\Delta(Ap-Aq)|$ does not fall outside the allowable proximity range $Rng(Ap-Aq)$. The movable portion 1Q on which the machining device 21 is installed needs to be moved under accurate positioning control. Therefore, the controller unit 4 applies, to the movable portion 1Q, a position command of an operation profile set in advance by the user, without making any change to the position command.

The running-alongside control unit 11 creates an operation profile of the movable portion 1P based on the position information on the movable portions 1P and 1Q such that $|\Delta(Ap-Aq)|$ does not fall outside the allowable proximity range $Rng(Ap-Aq)$. This operation profile includes a position command directed to the movable portion 1P. The running-alongside control unit 11 transmits the created operation profile to the controller unit 4. Note that the operation profile of the movable portion 1P may be created in advance by the user.

The controller unit 4 controls the position of the movable portion 1Q in accordance with the position command of the operation profile set by the user, and controls the position of the movable portion 1P in accordance with the position command of the operation profile transmitted from the running-alongside control unit 11. As a result, the controller unit 4 can appropriately control the movable portions 1P and 1Q while maintaining the connection of the cable 8a.

Note that even in the case of a combination of the three movable portions 1P to 1R, the linear conveyance system 51 can control the positions of the movable portions 1P to 1R similarly to the case of the combination of the two movable portions 1P and 1Q.

Next, a description will be given of an example in which the controller unit 4 performs position control for the combination of the three movable portions 1P to 1R. Here, a description will be given of a case where the movable portion 1P serves as an output movable portion on which a power supply device is installed, and the movable portions 1Q and 1R serve as machining movable portions on which the machining devices 21 and 22 are installed, respectively. The controller unit 4 collects the position information on the movable portions 1P to 1R acquired by the stator control units 3a to 3c. The controller unit 4 transmits the collected position information on the movable portions 1P to 1R to the distance calculation unit 9.

The distance calculation unit 9 calculates a difference between the positions of the movable portions 1P and 1Q and a difference between the positions of the movable portions 1P and 1R. That is, the distance calculation unit 9 calculates an inter-movable portion distance between the movable portions 1P and 1Q and an inter-movable portion distance between the movable portions 1P and 1R. For example, assuming that Ap denotes the position of the movable portion 1P, Aq denotes the position of the movable portion 1Q, and Ar denotes the position of the movable portion 1R, the distance calculation unit 9 calculates $|\Delta(Ap-Aq)|$, which is an absolute value difference between the positions of the movable portions 1P and 1Q, and $|\Delta(Ap-Ar)|$, which is an absolute value difference between the positions of the movable portions 1P and 1R. The distance calculation unit 9 transmits the calculated inter-movable portion distance to the running-alongside control unit 11.

In addition, the allowable distance holding unit 10 holds a proximity range allowed between the movable portions 1P and 1Q and a proximity range allowed between the movable portions 1P and 1R. Specifically, the allowable distance holding unit 10 holds the allowable proximity range Rng(Ap−Aq) represented by the range from Min(Ap−Aq), which is the minimum allowable value of $|\Delta(Ap-Aq)|$, to Max(Ap−Aq), which is the maximum allowable value of $|\Delta(Ap-Aq)|$. In addition, the allowable distance holding unit 10 holds an allowable proximity range Rng(Ap−Ar) represented by a range from Min(Ap−Ar), which is a minimum allowable value of $|\Delta(Ap-Ar)|$, to Max(Ap−Ar), which is a maximum allowable value of $|\Delta(Ap-Ar)|$.

A relationship among Min(Ap−Ar), Max(Ap−Ar), and the allowable proximity range Rng(Ap−Ar) is as follows: Min(Ap−Ar)≤Rng(Ap−Ar)≤Max(Ap−Ar).

For example, Min(Ap−Ar) is set on the assumption of a situation where the movable portions 1P and 1R are too close to each other and the cable 8b interferes, or a situation where the cable 8b bends to come into contact with the power supply device, the machining device 22, the movable portions 1P and 1R, or the primary-side power supply 5.

In addition, Max(Ap−Ar) is set on the assumption of, for example, a situation where the movable portions 1P and 1R are too far away from each other and the cable 8b may come off, a cable connector portion may be damaged, or the main body of the cable 8b may be damaged.

The controller unit 4 controls the movable portion 1P such that $|\Delta(Ap-Aq)|$ does not fall outside the allowable proximity range Rng(Ap−Aq), and that $|\Delta(Ap-Ar)|$ does not fall outside the allowable proximity range Rng(Ap−Ar). The movable portions 1Q and 1R on which the machining devices 21 and 22 are installed, respectively, need to be moved under accurate positioning control. Therefore, the controller unit 4 applies, to the movable portion 1Q and 1R, position commands of operation profiles set in advance by the user, without making any change to the position commands.

The running-alongside control unit 11 creates an operation profile of the movable portion 1P based on the position information on the movable portions 1P to 1R such that $|\Delta(Ap-Aq)|$ does not fall outside the allowable proximity range Rng(Ap−Aq) and that $|\Delta(Ap-Ar)|$ does not fall outside the allowable proximity range Rng(Ap−Ar). This operation profile includes a position command directed to the movable portion 1P. The running-alongside control unit 11 transmits the created operation profile to the controller unit 4. Note that the operation profile of the movable portion 1P may be created in advance by the user. Hereinafter, the allowable proximity ranges Rng(Ap−Aq) and Rng(Ap−Ar) may be simply referred to as allowable proximity ranges.

The controller unit 4 controls the positions of the movable portions 1Q and 1R in accordance with the position commands of the operation profiles set by the user, and controls the position of the movable portion 1P in accordance with the position command of the operation profile transmitted from the running-alongside control unit 11. As a result, the controller unit 4 can appropriately control the movable portions 1P to 1R while maintaining connection of the cables 8a and 8b.

Note that even in the case of a combination of four or more movable portions, the linear conveyance system 51 can control positions of the four or more movable portions similarly to the case of the combination of the three movable portions 1P to 1R. Even in the case of a combination of four or more movable portions, the controller unit 4 controls the positions of machining movable portions in accordance with position commands of an operation profile set by the user, and controls the positions of output movable portions in accordance with position commands of an operation profile transmitted from the running-alongside control unit 11.

In the linear conveyance system 51, the load weight to be applied to the movable portion 1P may be different from the load weight to be applied to the movable portions 1Q and 1R. For example, in a case where the load weight of the movable portion 1P serving as an output movable portion is larger than the load weight of the movable portions 1Q and 1R serving as machining movable portions, it is conceivable that acceleration/deceleration of the movable portion 1P cannot follow the movable portions 1Q and 1R and thus, inter-movable portion distances may fall outside the allowable proximity ranges Rng(Ap−Aq) and Rng(Ap−Ar). In addition, in a case where a plurality of machining movable portions is arranged for a single output movable portion, it is conceivable that the output movable portion cannot physically follow movement of the machining movable portions and thus, inter-movable portion distances may fall outside the allowable proximity ranges Rng(Ap−Aq) and Rng(Ap−Ar). In these cases, continuation of operation outside the allowable proximity ranges may lead to damage of the power supply device, the machining devices 21 and 22, and the like or an anomaly in machining operation. Therefore, when an inter-movable portion distance falls outside an allowable proximity range, the running-alongside control unit 11 outputs, to the controller unit 4 or the like, a signal (out-of-allowable proximity range signal) indicating that the inter-movable portion distance has fallen outside the allowable proximity range.

In this case, the controller unit 4 causes the movable portions 1P to 1R to stop moving, for example. In addition, for example, the controller unit 4 or the host controller causes the power supply device and the machining devices 21 and 22 to stop operation. In addition, the controller unit 4 may perform protection operation of causing each of the movable portions 1P to 1R to move so that inter-movable portion distances of the movable portions 1P to 1R fall within the allowable proximity ranges. Furthermore, the controller unit 4 may change operation patterns such that inter-movable portion distances do not fall outside the allowable proximity ranges. In this case, the operation program in which each operation profile has been defined by the user is changed. In this manner, the controller unit 4 prevents machining or the like from being executed in a state where inter-movable portion distances have fallen outside the allowable proximity ranges.

Figure 2:
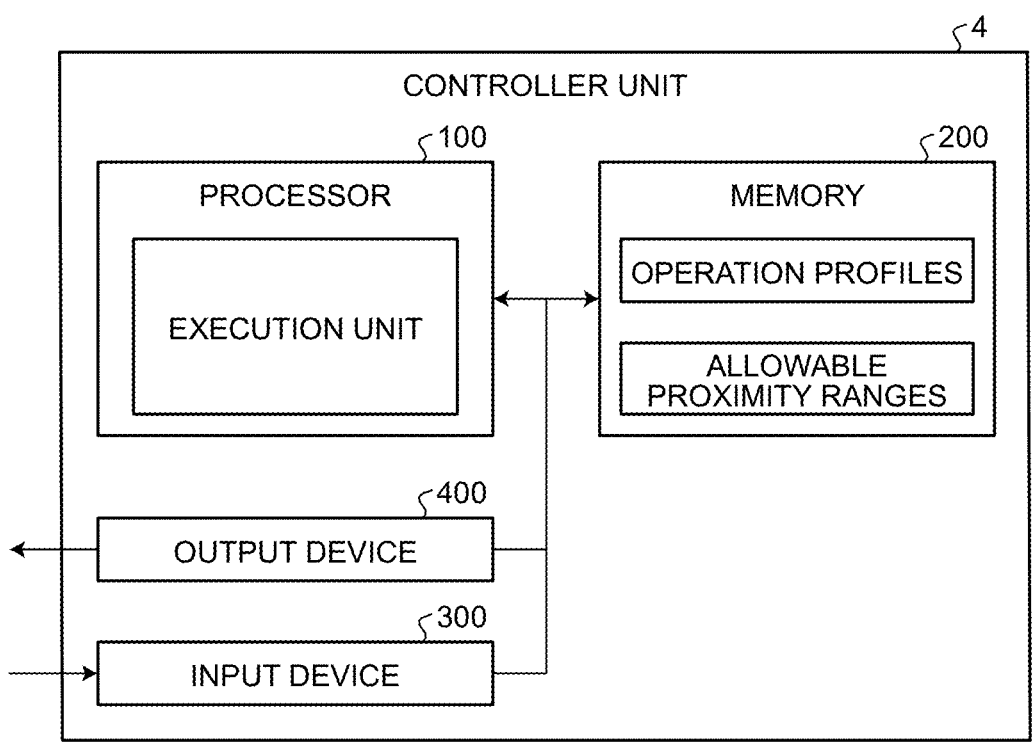
FIG. 2 is a diagram showing an example of a hardware configuration that implements a controller unit included in a control apparatus according to the first embodiment.

Here, a hardware configuration of the controller unit 4 will be described. FIG. 2 is a diagram showing an example of a hardware configuration that implements the controller unit included in the control apparatus according to the first embodiment. The controller unit 4 can be implemented by an input device 300, a processor 100, a memory 200, and an output device 400. Examples of the processor 100 include a central processing unit (CPU) (also referred to as a processing device, an arithmetic device, a microprocessor, a microcomputer, or a digital signal processor (DSP)) and a system large-scale integration (LSI). Examples of the memory 200 include a random access memory (RAM) and a read only memory (ROM).

The controller unit 4 is implemented by the processor 100 reading and executing a computer-executable control program for executing operation of the controller unit 4, the program being stored in the memory 200. It can also be said that the control program that is a program for executing the operation of the controller unit 4 causes a computer to execute a procedure or a method of the controller unit 4.

The control program to be executed by the controller unit 4 is modularly configured in such a way as to include an execution unit that executes various types of processing. The execution unit is loaded on a main storage device, and is generated on the main storage device.

The input device 300 receives the position information on the movable portions 1P to 1R from the stator control units 3a to 3c, and transmits the position information to the processor 100. The input device 300 also receives operation profiles including position commands from the running-alongside control unit 11, and transmits the operation profiles to the processor 100.

The memory 200 stores the operation profiles, allowable proximity ranges, and the like. Here, the allowable proximity ranges refer to the above-described allowable proximity ranges Rng(Ap–Aq) and Rng(Ap–Ar). In addition, the memory 200 is used as a temporary memory when the processor 100 executes various types of processing. The output device 400 outputs current commands to the stator control units 3a to 3c. In addition, the output device 400 outputs the position information on the movable portions 1P to 1R to the distance calculation unit 9.

The control program may be stored as a file in an installable format or an executable format on a computer-readable storage medium, and provided as a computer program product. Furthermore, the control program may be provided to the controller unit 4 via a network such as the Internet. Note that some of the functions of the controller unit 4 may be implemented by dedicated hardware such as a dedicated circuit, and some of the other functions thereof may be implemented by software or firmware.

In addition, the hardware configuration illustrated in FIG. 2 may include functions of the stator control units 3a to 3c. Furthermore, the hardware configuration illustrated in FIG. 2 may include the function of at least one of the distance calculation unit 9, the allowable distance holding unit 10, and the running-alongside control unit 11.

The linear conveyance system 51 is applied to, for example, a production line of an automated factory. Examples of the production line include a production line for assembling industrial products, and a production line for packaging foods.

The linear conveyance system 51 separately controls the movable portions 1P to 1R arranged on the same conveyance path, and constructs a plurality of processes on the same conveyance path. As a result, it is possible to reduce the installation area of the facility, reduce takt time, and achieve flexible facility design. Note that a battery may be installed on the movable portions 1Q and 1R.

As described above, since an output device that outputs power, data, or the like to the movable portions 1Q and 1R is installed on the movable portion 1P, the weight of devices to be installed on the movable portions 1Q and 1R can be reduced. Thus, the linear conveyance system 51 can also be applied to a system that performs high acceleration/deceleration. In addition, the movable portions 1P to 1R can be configured under the same specifications. This enables the linear conveyance system 51 to be implemented at low cost, and enhance flexibility at the time of system change such as a change of a production line.

As described above, the linear conveyance system 51 of the first embodiment includes an output movable portion and a machining movable portion. An output device that outputs energy or data is installed on the output movable portion. A machining device that receives the energy or data from the output device is installed on the machining movable portion. In addition, the controller unit 4 separately controls the output movable portion and the machining movable portion. As a result, the linear conveyance system 51 can cause the movable portions (output movable portion and machining movable portion) to move with a high acceleration/deceleration, by reducing constraints to be imposed on drive patterns of the movable portions.

Second Embodiment

Next, a second embodiment will be described with reference to FIG. 3. In the second embodiment, degrees of deterioration of the cables 8a and 8b are predicted based on performance of the cables 8a and 8b.

Figure 3:
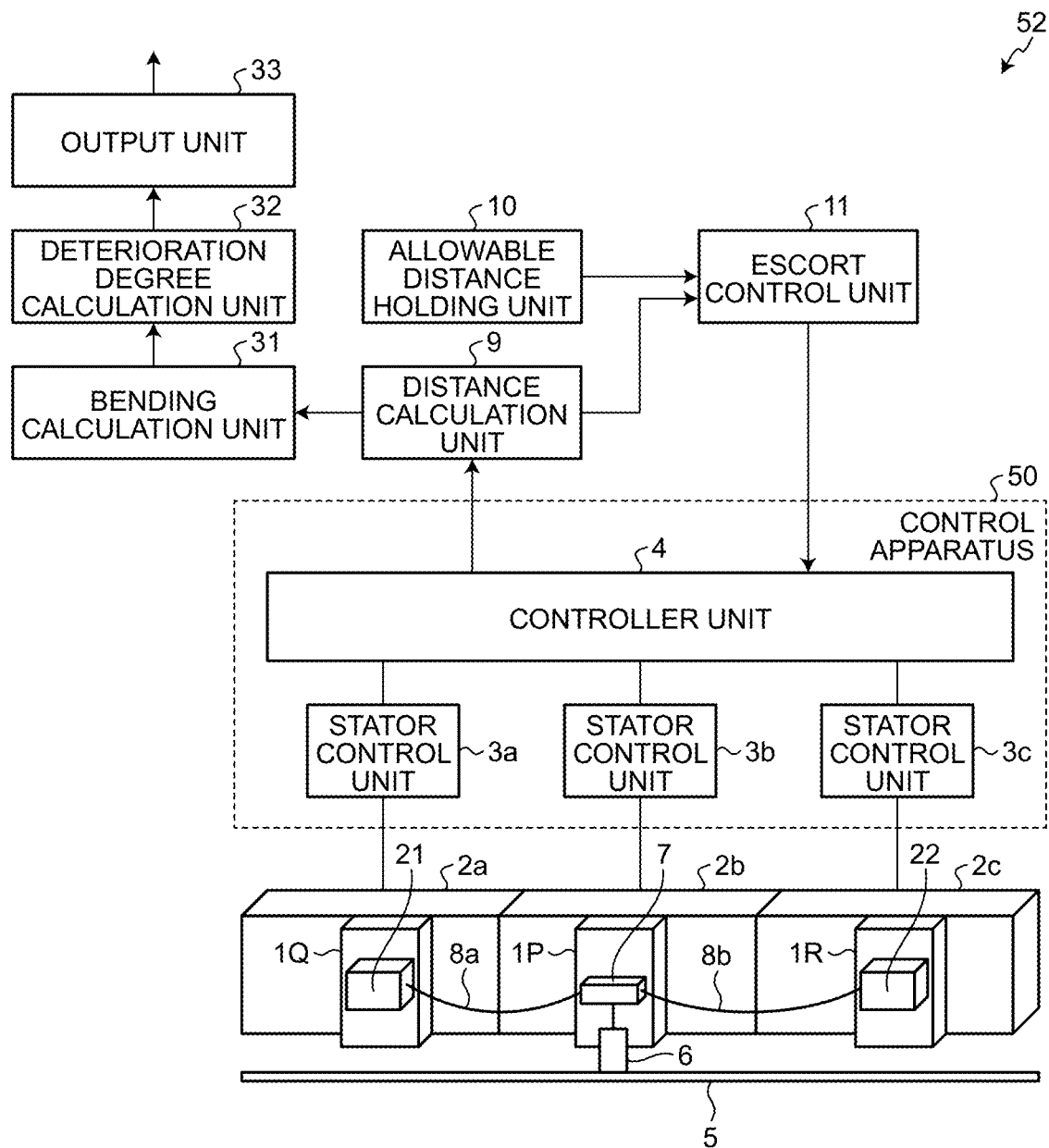
FIG. 3 is a diagram illustrating a configuration of a linear conveyance system according to a second embodiment.

FIG. 3 is a diagram illustrating a configuration of a linear conveyance system according to the second embodiment. Among constituent elements illustrated in FIG. 3, constituent elements that achieve the same functions as the constituent elements of the linear conveyance system 51 of the first embodiment illustrated in FIG. 1 are denoted by the same reference numerals, and redundant description will be omitted.

A linear conveyance system 52 includes a bending calculation unit 31, a deterioration degree calculation unit 32, and an output unit 33 in addition to the constituent elements included in the linear conveyance system 51. The bending calculation unit 31 is connected to the distance calculation unit 9, and acquires inter-movable portion distances from the distance calculation unit 9. The bending calculation unit 31 calculates bending states (bending histories) of the cables 8a and 8b based on the inter-movable portion distances and lengths of the cables 8a and 8b. The bending calculation unit 31 transmits the bending states to the deterioration degree calculation unit 32.

The deterioration degree calculation unit 32 calculates degrees of deterioration of the cables 8a and 8b based on the bending states. The output unit 33 outputs the degrees of deterioration of the cables 8a and 8b calculated by the deterioration degree calculation unit 32 to an external device such as a display device.

In the linear conveyance system 52, It is conceivable that even when the movable portions 1P to 1R continue operation within allowable proximity ranges, fatigue of the cables 8a and 8b caused by bending stress due to repeated bending of the cables 8a and 8b may cause damage such as a break in the cables 8a and 8b.

Damage of the cables 8a and 8b leads to failure of machining, a stop of a production line, and the like. Therefore, the linear conveyance system 52 performs diagnosis regarding the degrees of deterioration of the cables 8a and 8b before the cables 8a and 8b are damaged, and notifies a user of the degrees of deterioration of the cables 8a and 8b before the cables 8a and 8b are damaged. As a result, the cables 8a and 8b are replaced before being damaged.

A description will be given of a method of diagnosis regarding the degrees of deterioration of the cables 8a and 8b to be performed by the linear conveyance system 52. Examples of factors that affect the degrees of deterioration of the cables 8a and 8b include bending speeds and bending radii of the cables 8a and 8b, and the number of times the cables 8a and 8b are bent. For example, when the movable portions 1P to 1R come close to one another, the cables 8a and 8b are bent, and thus, the bending radii of connector portions of the cables 8a and 8b are reduced. Thereafter, when the movable portions 1P to 1R move away from one another, the cables 8a and 8b are stretched, and thus, the bending radii of the connector portions are increased. Thus, the number of times the cables 8a and 8b are bent is incremented as a result of repetition of these steps. Therefore, the bending calculation unit 31 calculates the bending speeds and bending radii of the cables 8a and 8b, and the number of times the cables 8a and 8b are bent, based on a mechanical configuration of the linear conveyance system 52 and proximity distances among the movable portions 1P to 1R.

The proximity distances among the movable portions 1P to 1R are calculated by the distance calculation unit 9. That is, the distance calculation unit 9 calculates $|\Delta(Ap-Aq)|$ and $|\Delta(Ap-Ar)|$ described above, based on the respective positions of the movable portions 1P to 1R. Then, the bending calculation unit 31 calculates bending states such as the bending radii and bending speeds of the cables 8a and 8b and the number of times the cables 8a and 8b are bent, based on the mechanical configuration of the linear conveyance system 52, $|\Delta(Ap-Aq)|$, and $|\Delta(Ap-Ar)|$.

As described above, the bending calculation unit 31 calculates bending states of the cables 8a and 8b based on design information on devices included in the linear conveyance system 52 and actual results of performance of the devices included in the linear conveyance system 52.

When calculating bending states, the bending calculation unit 31 uses design information on connector portions of devices connected to the cables 8a and 8b, the machining devices 21 and 22, the movable portions 1P to 1R, the fixed portions 2a to 2c, the pickup core 6, the regulator 7, the primary-side power supply 5, and the like. Furthermore, when calculating bending states, the bending calculation unit 31 uses results of performance of the cables 8a and 8b, and the like.

The deterioration degree calculation unit 32 calculates degrees of deterioration of the cables 8a and 8b based on the bending states calculated by the bending calculation unit 31. As the degrees of deterioration of the cables 8a and 8b increase, the cables 8a and 8b approach the end of their own lives. That is, the remaining lives of the cables 8a and 8b decrease as the degrees of deterioration increase.

For the linear conveyance system 52, the user creates a calculation formula for the degree of deterioration, from results of durability tests of the cables 8a and 8b acquired from a cable manufacturer, theoretical calculation results of durability, actual results of durability of the cables 8a and 8b, and the like.

The deterioration degree calculation unit 32 calculates the degrees of deterioration of the cables 8a and 8b by applying the bending states to the calculation formula for the degree of deterioration. The deterioration degree calculation unit 32 separately calculates the degree of deterioration of the cable 8a and the degree of deterioration of the cable 8b.

When the calculated degree of deterioration reaches a prescribed value, the deterioration degree calculation unit 32 outputs a deterioration reaching signal from the output unit 33 to an external device or the like. The deterioration reaching signal indicates that the degree of deterioration of the cable 8a or the cable 8b has reached the prescribed value. The deterioration reaching signal is a signal indicating that the cable 8a or the cable 8b will reach the end of life within a specific period (an hour, a day, or the like).

The prescribed value to be used by the deterioration degree calculation unit 32 is stored in advance in the deterioration degree calculation unit 32. This prescribed value is a value at which the cables 8a and 8b can be replaced before reaching the end of their own lives. The prescribed value is, for example, a value at which the cables 8a and 8b reach the end of their own lives in a case where the linear conveyance system 52 continues operation for a specific period of time. Therefore, the output unit 33 outputs a deterioration reaching signal the specific period of time before the cables 8a and 8b reach the end of their own lives.

As a result, the linear conveyance system 52 can notify the user that the cables 8a and 8b need to be replaced, and prompt to replace the cables 8a and 8b, before the cables 8a and 8b are damaged. The user replaces the cables 8a and 8b before the cables 8a and 8b are damaged. As a result, the linear conveyance system 52 can prevent the cables 8a and 8b from being damaged while machining is being performed. Note that the output unit 33 may output information indicating the degrees of deterioration to an external device or the like before the degrees of deterioration reach the prescribed value. As a result, the user can refer to the degrees of deterioration of the cables 8a and 8b before the degrees of deterioration thereof reach the prescribed value.

Note that the controller unit 4 of the linear conveyance system 52 has a hardware configuration similar to that of the controller unit 4 of the linear conveyance system 51. The memory 200 included in the controller unit 4 of the linear conveyance system 52 stores operation profiles, allowable proximity ranges, the calculation formula for the degree of deterioration, and the like.

As described above, according to the second embodiment, the linear conveyance system 52 calculates bending states of the cables 8a and 8b, calculates the degrees of deterioration of the cables 8a and 8b based on the bending states, and outputs a deterioration reaching signal to an external device or the like. As a result, it is possible to notify the user of the degrees of deterioration of the cables 8a and 8b before the cables 8a and 8b are damaged.

In the first embodiment and the second embodiment above, examples of the linear conveyance systems 51 and 52 have been described in which a plurality of machining devices is connected to a single output device such that the movable portion 1P serves as an output movable portion on which a power supply device is installed, and that the movable portions 1Q and 1R serve as machining movable portions on which the machining devices 21 and 22 are installed, respectively. However, for the linear conveyance systems 51 and 52, the number of output movable portions and the number of machining movable portions can be determined according to situations. For example, in the linear conveyance systems 51 and 52, a plurality of output devices may be connected to a single machining device on the assumption that the movable portion 1P serves as a machining movable portion on which a machining device is installed, and that the movable portions 1Q and 1R serve as output movable portions on which output devices are installed. That is, the number of output movable portions and the number of machining movable portions can be freely set, and the number of machining devices to be connected to a single output device and the number of output devices to be connected to a single machining device can also be determined according to situations.

The configurations set forth in the above embodiments show examples, and it is possible to combine the configurations with another known technique or combine the embodiments with each other, and is also possible to partially omit or change the configurations without departing from the gist of the present disclosure.

REFERENCE SIGNS LIST 1P to 1R movable portion; 2a to 2c fixed portion; 3a to 3c stator control unit; 4 controller unit; 5 primary-side power supply; 6 pickup core; 7 regulator; 8a, 8b cable; 9 distance calculation unit; 10 allowable distance holding unit; 11 running-alongside control unit; 21, 22 machining device; 31 bending calculation unit; 32 deterioration degree calculation unit; 33 output unit; 50 control apparatus; 51, 52 linear conveyance system; 100 processor; 200 memory; 300 input device; 400 output device.

The invention claimed is:
1. A linear conveyance system comprising:
a plurality of movable portions including permanent magnets;
a fixed portion including a coil to generate magnetic field for driving the movable portions, the fixed portion being coupled and arranged to form a conveyance path along which the movable portions move;
stator control circuitry to energize the coil and detect positions of the movable portions; and
controller circuitry to generate current commands and output the current commands to the stator control circuity, the controller circuitry generating the current commands based on position information, the current commands being for driving the movable portions, the position information being information on the positions of the movable portions, wherein
the movable portions include an output movable portion and a machining movable portion, the output movable portion being a movable portion on which an output device that outputs energy or data is to be installed, the machining movable portion being a movable portion on which a machining device is to be installed, the machining device being to be used for machining of a workpiece, the machining device being to be connected to the output device by a cable so as to receive the energy or the data from the output device, and
the controller circuity controls the output movable portion and the machining movable portion.

2. The linear conveyance system according to claim 1, further comprising:
allowable distance holding circuity to store an allowable proximity range, the allowable proximity range being an allowable range of a distance between the output movable portion and the machining movable portion;
distance calculation circuity to calculate an inter-movable portion distance based on position information on the output movable portion and position information on the machining movable portion, the inter-movable portion distance being the distance between the output movable portion and the machining movable portion; and
running-alongside control circuitry to generate a first position command, the first position command being for controlling a position of the output movable portion so that the inter-movable portion distance does not fall outside the allowable proximity range, wherein
the controller circuity controls the position of the output movable portion based on the first position command.

3. The linear conveyance system according to claim 2, wherein
when the inter-movable portion distance falls outside the allowable proximity range, the running-alongside control circuitry outputs a signal indicating that the inter-movable portion distance has fallen outside the allowable proximity range.

4. The linear conveyance system according to claim 1, wherein
the output movable portion is lighter in weight and smaller in size than the machining movable portion.

5. The linear conveyance system according to claim 2, further comprising:
bending calculation circuity to calculate a bending state of the cable based on the inter-movable portion distance;
deterioration degree calculation circuity to calculate a degree of deterioration of the cable based on the bending state; and
output circuity to output a deterioration reaching signal when the degree of deterioration reaches a prescribed value, the deterioration reaching signal indicating that the degree of deterioration has reached the prescribed value.

6. The linear conveyance system according to claim 1, wherein
the output device is a power supply device or a communication device, the power supply device outputting power to the machining device, the communication device outputting data to the machining device.

7. The linear conveyance system according to claim 1, wherein
the machining device includes at least one of a servomotor, a servo amplifier, an arm, a proximity sensor, a camera, a robot, a measurement device, and an inspection device.

8. The linear conveyance system according to claim 1, wherein
the controller circuity controls a position of the machining movable portion based on a second position command included in an operation profile created by a user.

9. A control apparatus comprising:
stator control circuitry to energize a coil included in a fixed portion and detect positions of a plurality of movable portions, the movable portions including permanent magnets, the coil generating magnetic field for driving the movable portions, the fixed portion being coupled and arranged to form a conveyance path along which the movable portions move; and
controller circuitry to generate current commands and output the current commands to the stator control circuity, the controller circuitry generating the current commands based on position information, the current commands being for driving the movable portions, the position information being information on the positions of the movable portions, wherein
the controller circuity controls an output movable portion and a machining movable portion in a case where the movable portions include the output movable portion and the machining movable portion, the output movable portion being a movable portion on which an output device that outputs energy or data is to be installed, the machining movable portion being a movable portion on which a machining device is to be installed, the machining device being to be used for machining of a workpiece, the machining device being to be connected to the output device by a cable so as to receive the energy or the data from the output device.

* * * * *